(12) United States Patent
Wallace

(10) Patent No.: US 11,434,180 B2
(45) Date of Patent: Sep. 6, 2022

(54) SYSTEM AND METHOD FOR UNIFORMLY MANUFACTURING A ROCKET FUEL GRAIN HORIZONTALLY IN A SINGLE SECTION

(71) Applicant: ROCKET CRAFTERS PROPULSION LLC, Cocoa, FL (US)

(72) Inventor: Kineo Wallace, Cocoa, FL (US)

(73) Assignee: VAYA SPACE, INC., Cocoa, FL (US)

(*) Notice: Subject to any disclaimer, the term of this patent is extended or adjusted under 35 U.S.C. 154(b) by 254 days.

(21) Appl. No.: 16/535,987

(22) Filed: Aug. 8, 2019

(65) Prior Publication Data

US 2020/0048158 A1 Feb. 13, 2020

Related U.S. Application Data

(60) Provisional application No. 62/716,267, filed on Aug. 8, 2018.

(51) Int. Cl.
| | | |
|---|---|---|
| C06B 21/00 | (2006.01) | |
| C06B 45/02 | (2006.01) | |
| B33Y 10/00 | (2015.01) | |
| B33Y 50/00 | (2015.01) | |
| B33Y 70/00 | (2020.01) | |
| B33Y 80/00 | (2015.01) | |
| B33Y 30/00 | (2015.01) | |

(52) U.S. Cl.
CPC .......... C06B 21/0075 (2013.01); C06B 45/02 (2013.01); B33Y 10/00 (2014.12); B33Y 30/00 (2014.12); B33Y 50/00 (2014.12); B33Y 70/00 (2014.12); B33Y 80/00 (2014.12)

(58) Field of Classification Search
CPC ..... C06B 21/0075; C06B 45/02; B33Y 10/00; B33Y 30/00; B33Y 50/00; B33Y 70/00; B33Y 80/00
See application file for complete search history.

(56) References Cited

U.S. PATENT DOCUMENTS

| | | |
|---|---|---|
| 6,638,467 B1 | 10/2003 | Yamamoto |
| 9,086,033 B2 † | 7/2015 | Dushku |
| 9,453,479 B1 † | 9/2016 | Jones |
| 9,822,045 B2 | 11/2017 | Jones |
| 9,890,091 B2 | 2/2018 | Jones |
| 10,286,599 B2 | 5/2019 | Jones |

(Continued)

OTHER PUBLICATIONS

Eilers et al., "Correlation of Hybrid Rocket Propellant Regression Measurements with Enthalpy-Balance Model Predictions," Journal of Spacecraft and Rockets, vol. 45, No. 5, Sep.-Oct. 2008, pp. 1010-1020.

(Continued)

*Primary Examiner* — Larry W Thrower
(74) *Attorney, Agent, or Firm* — Birch, Stewart, Kolasch & Birch, LLP

(57) ABSTRACT

A system and method for producing fuel grain for a rocket engine horizontally with an additive manufacturing machine is disclosed. To begin, a fuel grain model is received. The fuel grain model is oriented in a direction of a central core axis and divided into two-dimensional layers with defined footprint areas. In accordance with the fuel grain model, a first layer is printed by applying successive fuel beads in a direction primarily parallel to the central core axis.

21 Claims, 13 Drawing Sheets

(56) References Cited

U.S. PATENT DOCUMENTS

| | | | |
|---|---|---|---|
| 10,309,346 | B2 | 6/2019 | Jones |
| 10,730,236 | B2 † | 8/2020 | Houser |
| 10,731,565 | B2 † | 8/2020 | Purcell |
| 10,738,378 | B2 † | 8/2020 | Forseth |
| 10,739,087 | B2 † | 8/2020 | Lacy |
| 2007/0229497 | A1 | 10/2007 | Zinniel et al. |
| 2013/0042951 | A1 | 2/2013 | Fuller |
| 2013/0224423 | A1 | 8/2013 | Mikulak et al. |
| 2016/0167313 | A1 | 6/2016 | Swanson et al. |
| 2016/0236421 | A1 | 8/2016 | Mannella et al. |
| 2017/0073280 | A1 | 3/2017 | Jones |
| 2017/0129183 | A1 | 5/2017 | Dufort et al. |
| 2017/0252966 | A1 | 9/2017 | Susnjara |

OTHER PUBLICATIONS

Whitmore et al., "High Regression Rate Hybrid Rocket Fuel Grains with Helical Port Structures," Journal of Propulsion and Power, vol. 31, Issue 6, Published online Jul. 23, 2015, pp. 1-14.

Its_Rocket_Science;published_2011;Stratasys_Fortus_article_from_website.†

Whitmore; High_Regression_Rate_Hybrid_Rocket_Fuel_Grains_with_Helical_Support_Structures;50th_American_Institute_of_Aeronautics_and_Astronautics;50th_AIAA/ASME/SAE/ASEE_Joint_Propulsion_Conference_and Exhibit;July_28_30_2014;Cleveland_Ohio.†

† cited by third party

SYSTEM AND METHOD FOR UNIFORMLY MANUFACTURING A ROCKET FUEL GRAIN HORIZONTALLY IN A SINGLE SECTION

CROSS-REFERENCE TO RELATED APPLICATIONS

This application claims the benefit under 35 U.S.C. § 119(e) of the filing date of U.S. Patent Application No. 62/716,267, for THE METHOD OF UNIFORMLY MANUFACTURING A ROCKET FUEL GRAIN IN A SINGLE SECTION HORIZONTALLY, which was filed on Aug. 8, 2018, and which is incorporated here by reference.

BACKGROUND

This specification relates to manufacturing solid fuel grains for rocket propulsion systems and the solid fuel grains produced through the manufacturing.

When launching spacecraft into orbit, rocket scientists typically use one of three primary types of chemical rockets, i.e., solid propellant, liquid propellant, or hybrid designs that use a solid propellant with a liquid or gaseous reactant. Each of these types have their benefits and limitations. For example, solid propellant engines have the greatest thrust-to-weight ratio as well as the greatest simplicity. However, these engines are not very efficient. Liquid propellant engines have a lower thrust-to-weight ratio and are the most complicated of the three types of chemical rockets. Even so, they have a much higher efficiency than solid propellant engines. Hybrid engines share the simplicity and high thrust-to-weight ratio with solid propellant engines. They also have the ability to throttle and maintain a high efficiency like that of a liquid propellant engine.

Hybrid engines have a simplicity that reduces the number of points of failure that other types of engines do not. These engines are cost effective to produce as the fuel itself is the combustion chamber of the engine and contain few moving parts. In addition, they are the safest form of rocket engine because the propellants are stored in two different states of matter which significantly reduces, or even eliminates the chances of them exploding.

Traditional hybrid engine fuel grains are cast molded either in a single piece or in sections. When they are built for small engines, these fuel grains can be produced as a single piece. However, as the engine size and power increase, fuel grain designers must produce fuel grains in sections to maintain uniformity and consistency of chemical reactant components in the fuel grains. When the fuel grains are made in sections, gaps can form between the sections, potentially allowing gas leaks at the section breaks.

Conventionally, when using a cast manufacturing method, these hybrid fuel grains are produced in a vertical manner to ensure that any air bubbles rise to the top of the grain. This vertical production limits the height of the fuel grain pieces due to the size of the structure containing the fuel grain while it cures. Furthermore, cast grains can require days, weeks, or even months to fully cure before they can be used which means that the total manufacturing time is quite long.

Established methods of additive manufacturing are capable of successfully solving the issue of uniform fuel consistency. For example, in U.S. Pat. No. 9,822,045, the fuel grain or solid fuel propellant is manufactured by an additive manufacturing technique by producing concentric ring-shaped beaded structures which are forming on the build platform. See Jones, Ronald D., "Additive Manufactured Thermoplastic-Aluminum Nanocomposite Hybrid Rocket Fuel Grain and Method of Manufacturing Same." U.S. Pat. No. 9,822,045, United States Patent and Trademark Office, 21 Nov. 2019.

However, these methods still require fuel grain to be produced vertically. The fuel grains must still be produced in sections as the engines get larger. In these conventional methods, the fuel grain is produced from the bottom up about the central port axis of the fuel grain. The vertical height of the additive manufacturing systems is limited due to the effects of gravity on the machines and on the material used in manufacturing, given the potential for the structure to start leaning which may result in the scrapping of the entire fuel grain. The height of the structure required to house the machine limits the total height of the machine as well.

SUMMARY

In general, one innovative aspect of the subject matter described in this specification can be embodied in methods that include the actions of producing a fuel grain for a rocket engine horizontally with an additive manufacturing machine. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

A method for producing fuel grain for a rocket engine horizontally with an additive manufacturing machine may start with receiving a fuel grain model that is oriented in a direction of a central core axis and divided into two-dimensional layers with defined footprint areas. The fuel grain may be printed in accordance with the fuel grain model by applying successive fuel beads in a direction primarily parallel to the central core axis.

Printing may include applying successive fuel beads continuously for a predefined distance in the direction primarily parallel to the central core axis.

A first layer may be printed in accordance with the fuel grain model thereby filling a determined footprint area associated with the first layer with fuel material. At least one subsequent layer may be printed on top of the first layer after moving a print head to a height of the first layer in order to produce a fuel grain in a horizontal position with respect to the central core axis of the fuel grain model.

The first layer may be printed in a continuous bead path.

The fuel grain model may be received from a program stored in a memory.

The method may further include printing successive layers by fuel beading to complete the fuel grain.

The fuel grain may be formed by printing successive layers of dissolvable core. The fuel grain and the dissolvable core may be printed layer by layer.

The fuel grain may be supported by a support structure comprising the fuel material.

The fuel grain may be supported by a support structure that is made of a different material than the fuel material and can be dissolved in a solution.

The fuel grain may be supported by unique geometrically shaped bead layers that create a support structure.

The fuel grain may be produced on a semi-cylindrical support structure. The semi-cylindrical support structure may be printed layer by layer along with the fuel grain. The semi-cylindrical support structure may be a solid build platform that includes mechanized sections that rise up to push the fuel grain away from the build platform when the fuel grain is completed.

The layers of the fuel grain may be supported by a form that is placed inside of the fuel grain to support the fuel grain layers. In some implementations, the form is placed inside the fuel grain when half of the layers have been printed.

A printing path may not follow along the axis of the fuel grain.

A build platform for an additive manufacturing machine for building rocket fuel grain may eliminate the need for support structures by including a surface that is designed so that the surface is conformally configured to an arc of a cylindrical side wall of a fuel grain, the fuel grain being cylindrical and having a top, bottom, and cylindrical side wall. The build platform may include mechanized sections that displace generally orthogonally from a surface of the platform to push the fuel grain away from the build platform.

A heating element may be embedded into the build platform.

A fuel grain produced using the horizontal manufacturing method disclosed above is also contemplated by this specification.

The subject matter described in this specification can be implemented in particular embodiments so as to realize at least one or more of the following advantages.

A horizontal fuel grain production system of this specification uses a horizontal manufacturing method to produce fuel grain that does not need to be produced in sections. By producing the fuel grain horizontally instead of vertically, as a traditional method does, the horizontal manufacturing method does not need to limit the overall "Z" length of the fuel grain. Since the horizontal manufacturing method does not need sections, the method increases uniformity and consistency in the fuel grain and reduces the number of potential points of failure. This system and manufacturing method allows for more complicated port and grain structures to be created since additive manufacturing machines can produce any shape or structure imaginable.

In order to manufacture fuel grain horizontally, many layers of the grain material are deposited in a bead pattern that generally follows the primary core axis of the grain. Creating layers in this manner produces hybrid fuel grains in a consistent and even distribution of fuel throughout the entire grain as each layer is placed by a machine exactly the same as all previous layers. The linear beads of material running from the beginning to the end of the grain further serve as a guide for combustion reactants and products to flow towards a rocket nozzle through the core flow path.

Since the bead pattern follows the flow path of the propellant through the core of the grain, the valleys along the grain will reduce the depth of the boundary layer that separates the combustion flame wall from the grain. By reducing the boundary layer, heat transfer between the flame wall and the grain is greater, thus increasing the regression rate of the fuel grain.

Solid fuel grains for rocket propulsion systems are made in a horizontal manner using a form-shaped support structure for the fuel grains while the fuel grains are being printed. This form-shaped support structure supports the bottom half of the grain, eliminating fusion and warping issues. The form-shaped support structure may include mechanized sections within the structure that rise up to separate the newly-printed fuel grain from the surface of the build platform.

The horizontal manufacturing method thus may use a build surface that is shaped to form fit the bottom of the fuel grain so that as layers of the grain are built up, they are supported by the build surface. This form-shaped support structure supports the bottom half of the grain to reduce fusion and warping issues. This support structure may be preconfigured or printed from various materials. A preconfigured form-shaped support structure also eliminates the need for printed support structures, which increases the speed of mass production. Furthermore, the form-shaped support structure as constructed according to the teachings of the present application can more easily separate from the fuel grain than printed structures. The form-shaped build surface can also contain a heating element so that when the material for the fuel train is placed on the build surface, the material will adhere more securely to prevent separation from the build surface.

When the printing process is complete, a build plate of the build surface may be configured with mechanized sections that raise up to separate the printed part from the build surface. Since a horizontally printed fuel grain has a larger surface area in contact with the build surface, it is desirable to provide some technique to facilitate release of the printed fuel grain from the build surface. The mechanized sections are desirable provided to enable the physical separation of the printed fuel grain from the build surface. Alternatively, the conformally configured build surface may be printed on a generally planar print bed and be provided with printed separation areas that may be easily mechanically interrupted to separate the fuel grain from the printed conformally configured build surface.

By producing fuel grain using the horizontal manufacturing process, the horizontal fuel grain production system of this specification can mass produce solid propellant, hybrid, tribrid, and other rocket engines at a high rate and large scale while maintaining a safe environment. The process allows for compounding different blends of material for the grain and evenly distributing the blends throughout the entire structure. The process also allows changing the grain material and composition at different levels in the grain using multiple print heads to change the combustion chemistry during different times of the burn.

By printing in a continuous horizontal printing pattern, the horizontal fuel grain production system can continuously print, thus reducing the total printing time.

Three-dimensional printing of the grain also improves the consistency of the overall structure inside of the grain. Thus, eliminating the formation of gaps or voids that can cause unstable combustion. The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The present specification is directed to a horizontal fuel grain production system that produces a fuel grain for rocket engine-based propulsion systems. The disclosed system uses a horizontal production method that produces grains in a consistent and reproducible manner at a high rate about their horizontal axes using specific bead patterns and, in some implementations, form-shaped support structures.

A solid fuel grain for both solid and hybrid rocket engines has a generally cylindrical structure with one or more ports passing through the center in many different shapes that affect the combustion rate and stability in different ways. The ports act as flow paths for combustion reactants and products to flow through the engine from one end of the combustion chamber to the other and through to the rocket nozzle. Traditional hybrid engines have lower regression rates than solid engines due to a boundary layer between the solid fuel grain and a flame wall of the combustion reaction. See, for example, Walker, Sean D., (2015). "High Regression Rate Hybrid Rocket Fuel Grains with Helical Port Structures." Utah State University, Logan, Utah. Hybrid rocket engines will typically incorporate more than one port in a grain to increase the total surface area of the flow path to increase the total amount of fuel that can be consumed at once.

Conventionally, to produce the fuel grain, a fuel grain system uses a manufacturing machine or method that produces fuel grain vertically. According to an implementation as contemplated by this specification, a horizontal fuel grain production system uses a process to produce fuel grain horizontally. Upon inspection, one of ordinary skill in the art could readily ascertain how the fuel grain is printed. The horizontal fuel grain production system may include a build surface with mechanized sections that raise to separate the fuel grain from the build surface. Additionally, the system may include a solid support core inside the fuel grain to support the printed layers.

Figure 1:
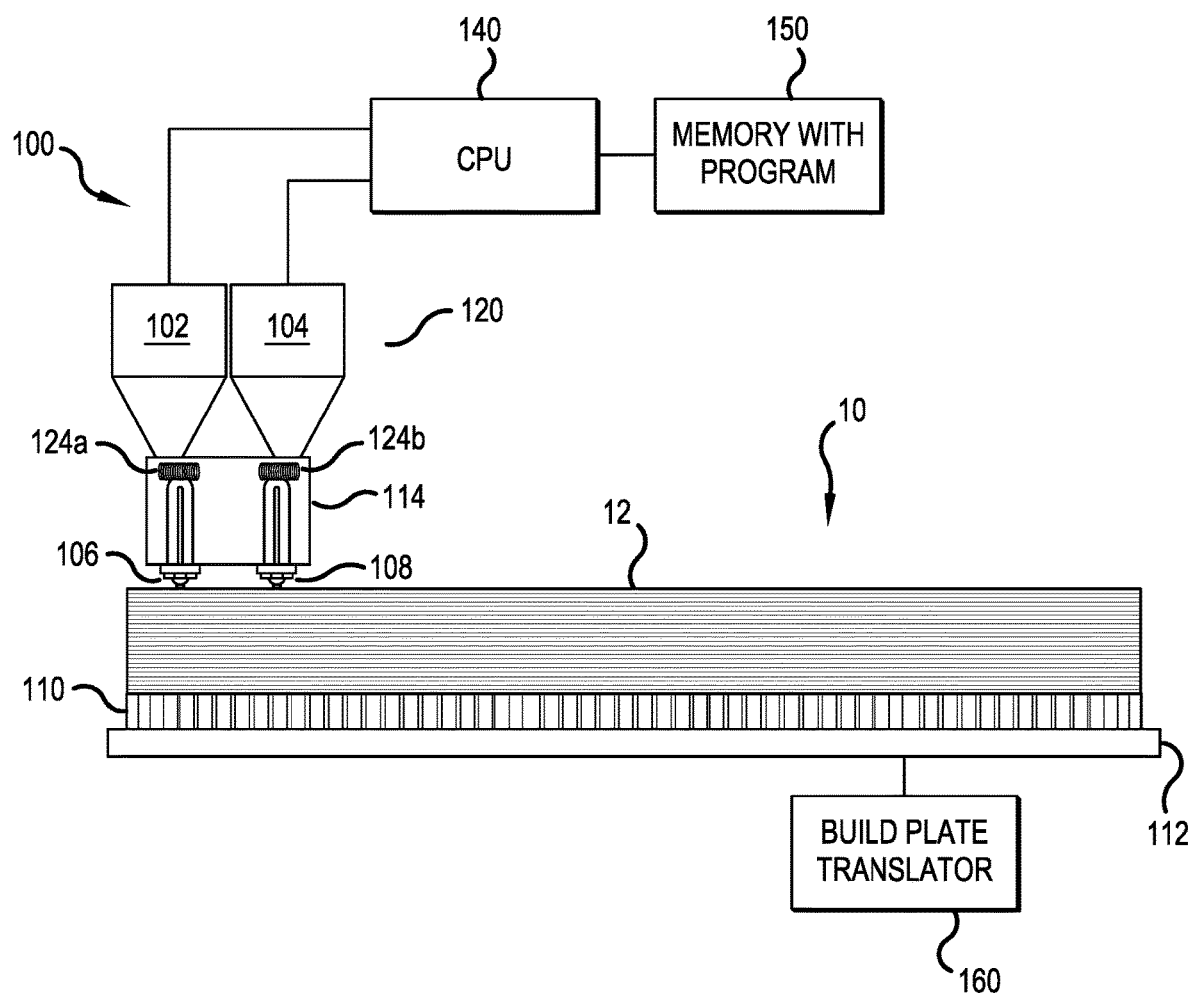
FIG. 1 is a two-dimensional view of a horizontal fuel grain production system that produces fuel grain in a horizontal manner.

FIG. 1 illustrates an example two-dimensional view of horizontal fuel grain production system 100 that produces a fuel grain, e.g., fuel grain 10, in a horizontal manner with a dual-material hopper 102, 104 fed additive manufacturing machine 120. Although a dual-material hopper is shown, the horizontal fuel grain production system 100 can use other additive manufacturing machines e.g., a spool-fed, powder-biased, free form fabrication system, a single material hopper, dual print head single material hopper, or more than two hoppers. While FIG. 1 illustrates the use of two additive print heads printing two materials, in practice any number of print heads may be used to print the fuel grain with any number of materials to implement the objectives of the grain designer.

The horizontal fuel grain production system 100 also includes a processing unit, e.g., central processing unit 140, and a memory 150 that stores a program for modeling the fuel grain. The processing unit is configured to execute the program for modeling the fuel grain during operation. This program guides the position of the print head following the specific print method disclosed with respect to FIG. 3.

In one implementation, each hopper 102, 104 feeds into a heater, e.g., heater 124a or heater 124b, inside the print head 114 that melts primary grain material from one hopper and a secondary material, typically a support material from the other hopper. Each heater may individually heat the material from each hopper. For example, heater 124a may heat the material from hopper 102 at one temperature and heater 124b may heat the material from hopper 104 at a same or different temperature as would be understood in the art of additive manufacture. The horizontal fuel grain production system 100 can use any number of materials in the hoppers. For example, Acrylonitrile Butadiene Styrene (ABS) thermoplastic can be used in one hopper and a water-soluble material can be used in the other. Although these materials are disclosed, the horizontal fuel grain production system 100 is not limited to using these materials. The fuel grain can be made from a chemical reactant for combustion. Any suitable grain material and support material may be used. The horizontal fuel grain production system 100 can control the heat of the heater to provide desirable consistency and bonding of the material being printed as would occur to one of ordinary skill in the art. Furthermore, the horizontal fuel grain production system 100 has the ability to print any desirable form into the fuel grain using the printing technique described as would occur to one of ordinary skill in the art.

In some implementations, during printing, the fuel grain model requires a support structure so that the model is secured in position while it is being printed. Before beginning a grain print, the horizontal fuel grain production system 100 determines a support structure 110 that should be placed underneath any steep overhangs as the fuel grain is being printed. The support structure 110 may, for example, fit the form of the generally cylindrical shape of the fuel grain. The fuel grain fuel grain has a top, bottom, and cylindrical side walls.

In some implementations the support structure, e.g., support structure 110, can be semi-cylindrical. In one implementation, the support structure can be printed using the additive manufacturing process. This support structure can be made out of support material, e.g., a water-soluble material. The horizontal fuel grain production system may print the support material simultaneously in conjunction with printing the fuel grain. Each object, the fuel grain and the support structure, may be printed layer by layer. In other implementations, the support structure, e.g., support structure 110, can be a build platform shaped to fit the form of the solid fuel grain model as disclosed below with regard to FIGS. 6-11.

In an implementation, the support structure 110 is beneficial for production using any incline less than 45-50 degrees with a traditional cylindrical bead pattern from extruder nozzles 106, 108. However, in some implementations, the fuel grain overhang can be shallower while requiring less support simply by changing the shape of the nozzles 106, 108 in the horizontal fuel grain production system 100 to produce other bead patterns, e.g., triangles or hexagons. The horizontal fuel grain production system 100 can increase grain consistency by changing the bead shape. However, this change may also increase the manufacturing time.

In the horizontal fuel grain production system 100, a build plate 112 may be either a stationary platform or a platform that moves about the horizontal plane to increase machine production speed. For example, a build plate translator 160 may translate the build plate in a direction along the axis of the grain core to speed production though the use of know translation techniques used for example in milling machines or the like. This platform 112 may preferably contain a heating element inside of it to improve part adhesion to the build plate 112 and/or to reduce or eliminate warping of the fuel grain. In a traditional machine this build plate 112 is a monolithic flat and smooth surface so that it can support production of many different parts. In such a circumstance, a conformally configured grain support 110 may be printed on the bed or may be permanently constructed as previously discussed.

During grain printing, a print head 114 may move along the X, Y, and Z axes using a system of electronically controlled motors that allow for precise placement of the grain material and support structure in accordance with current machine accuracies. One of ordinary skill in the art would understand how to program the print head 114. Alternatively, as previously mentioned, one or more axes of movement may be accommodated by movement of the build plate under the print head using the built plate translator 160, if provided.

Figure 2:
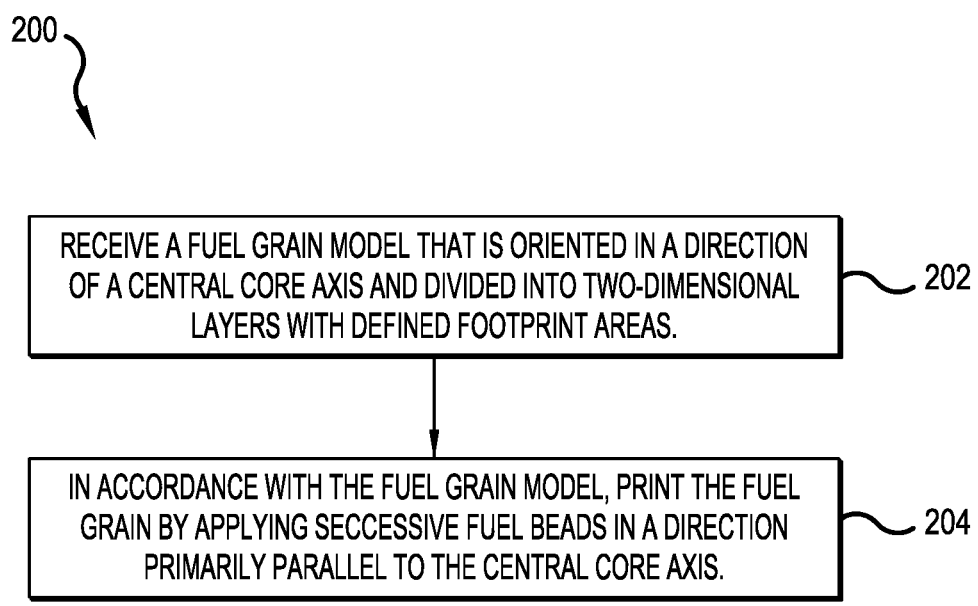
FIG. 2 is a flowchart of an example process 200 for horizontally producing fuel grain.

FIG. 2 is a flowchart of an example process 200 for horizontally producing fuel grain. For convenience, the process 200 will be described as being performed by a system such as the horizontal fuel grain production system 100 of FIG. 1. Prior to printing, a preprocessing system makes a model of the fuel grain and the support structures required for printing in a manner generally familiar to those of ordinary skill in additive manufacturing. Unlike conventional systems that print vertically, to print horizontally, the preprocessing system first orients a fuel grain model in a direction of a central core axis. Once the model is created and oriented, the preprocessing system then preferably divides the oriented fuel grain model into two-dimensional layers with defined footprint areas that increase with each subsequent two-dimensional layer until a width of the fuel grain model is achieved. The horizontal fuel grain production system 100 receives the fuel grain model that is oriented in a direction of the central core axis and already divided into two-dimensional layers (202). The system 100 then prints the fuel grain by applying at least one fuel bead in a direction primarily parallel to the central core axis (204). Printing may include applying successive fuel beads continuously for a predefined distance in the direction primarily parallel to the central core axis. For example, printing may be accomplished by printing a first layer of the fuel grain in a continuous bead path filling the determined footprint area of the layer with fuel material and then printing successive layers in a similar manner.

To print, the melted materials flow through the respective injection nozzles 106, 108 of FIG. 1. These nozzles then extrude the melted materials along a primary axis of grain in a horizontal linear pattern 12. In some implementations, the horizontal fuel grain production system 100 uses other patterns that do not follow directly along the axis, but remain in the same horizontal plane. The print head 114 prints fuel grain in a bead pattern along a horizontal axis of the grain model.

The system prints subsequent layers on top of the first layer as described below with regard to FIG. 3 to produce a fuel grain in a horizontal position with respect to the central core axis of the fuel grain model as illustrated in step 208 of FIG. 2.

Figure 3:
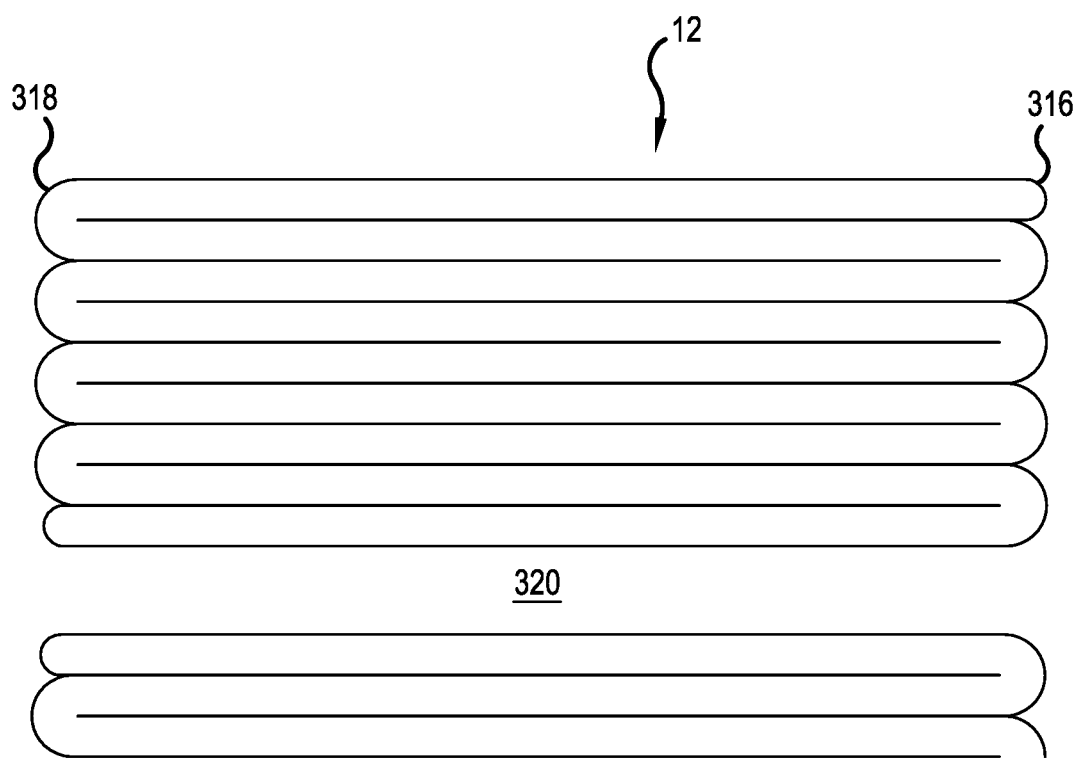
FIG. 3 illustrates an exaggerated pattern for horizontal printing executed by the horizontal fuel grain production system.

FIG. 3 illustrates an exaggerated pattern for horizontal printing executed by the horizontal fuel grain production system 100 of FIG. 1. The pattern may be set in the program that describes the fuel grain model that is executed by the processing unit. In the system 100, a print head 114 follows a horizontal pattern while placing beads for each layer 12 in one continuous horizontal sheet. The print head 114 starts at an edge of one corner of a plane 316 of a printing platform and runs along the printing platform and stops at a defined length of the fuel grain as defined by the fuel grain model following the central axis. Once the print head 114 reaches the opposite end of the printing platform at the appropriate stopping point, the print head 114 moves perpendicular to the primary axis at the equivalent of the thickness of the bead pattern 218. The print head 114 then continues printing back down the length of the grain. The horizontal fuel grain production system 100 creates a snaking printing pattern 12 continues until the entire grain is completed. Continuous printing in such a pattern is not required, but does increase the speed of production as the print head 114 is using time most efficiently. The specific pattern allows for a continuous layer of material to be printed without stopping the print head thereby reducing printing time.

In some implementations, the print head 114 will stop the pattern if there is a port structure 320 that divides the horizontal plane so as to lay support material in the port or to leave space open for the primary combustion flow. If there is no port in the plane, the print head 114 will continue printing the pattern for the entirety of the layer.

Figure 4:
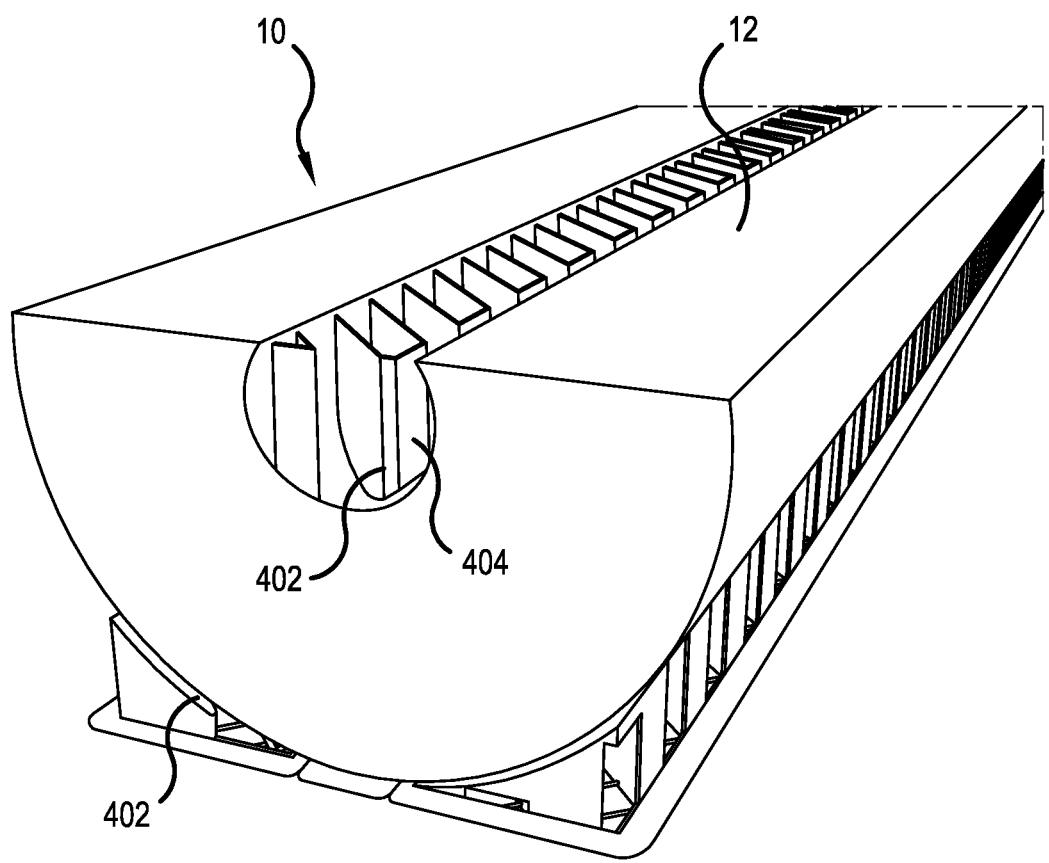
FIG. 4 is an isometric view of a partially completed fuel grain with a support structure supporting the side and the central reactant path.

FIG. 4 is an isometric view of a partially completed fuel grain with a support structure supporting the side and the central reactant path. As shown, the fuel grain 10 lies on one side so that the entire grain can be produced in one section. In one implementation, the fuel grain 10 is positioned on a printed support structure 402 that may be made out of the same material as the grain 10 or a secondary material that can be easily removed or dissolved in a liquid, e.g., water. If the support structure 402 is constructed out of the same material as the grain 10, the support structure 402 is preferably provided with tabs that are more easily removable. In this event, a support structure made out of the same material as the grain would normally be removed by a subtractive manufacturing technique. A support structure 402 printed by the secondary material may be alternatively dissolved through the use of a liquid such as water.

As illustrated, FIG. 4 shows a primary bead path that a bead pattern 12 follows along the central axis. In one implementation, the horizontal fuel grain production system may prefer to lay the beads axially along the core. Alternatively, in another implementation, the system may lay the beads transversely with respect to the axis of the core.

In a core port, the support material 404, if printed of the primary material, may not completely block off the path so that the support material 402 does not need to be removed during production and can be left in place during engine construction. Thus, in some implementations, support material 404 can be left in the fuel grain without removal because it can be used as an ignition source for the engine due to its lower density and higher surface area. In some implementations, the support material 404 may be water-soluble and is typically removed before use of the fuel grain. In other implementations, the support material 404 for the core port may be any material that does not impede flow through the central channel of the grain.

Although FIG. 4 illustrates that a surface of the fuel grain that forms the core port as smooth, in some implementations the surface may be irregular to achieve a higher regression rate that would occur to one of ordinary skill in the art. The surface may be any suitable shape that conforms to the shape of the fuel grain. As disclosed above, during combustion, the support material 404 can be consumed just as the rest of the grain 10. This support material 404 provides an extra boost in thrust at the beginning of launch due to the increased surface area, as well as increase the speed of production as the removal of that material is unnecessary.

Figure 5A:
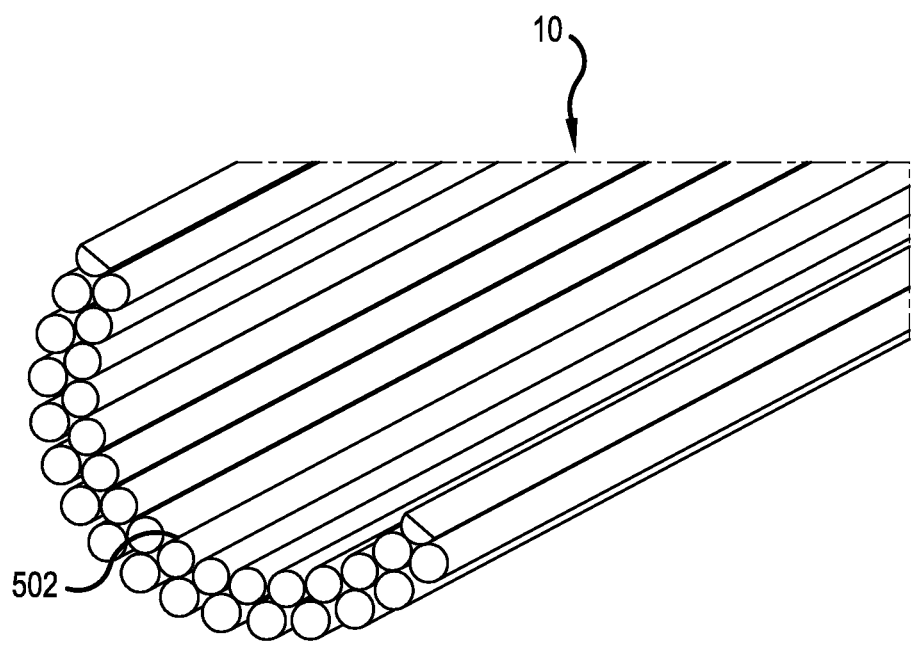
FIG. 5a illustrates a cutaway and enlarged view of a bead pattern about a port.

FIG. 5a illustrates a cutaway and enlarged view of a bead pattern about a port. As illustrated, each bead in a bead pattern follows along a primary axis. The bead pattern also leaves spaces 502 between each bead that follows along the primary axis. The gaps produced by the spaces 502 break up a boundary layer between a flame wall and a wall of the port. As a result, the boundary layer is forced closer to the flame wall which increases the heat transfer between the combustion reaction and the fuel grain which increases the regression rate of the grain. For a description of flame wall, see, for example, Eilers, Shannon D., (2008). "Correlation of Hybrid Rocket Propellant Regression Measurements with Enthalpy-Balance Model Predictions." Utah State University, Logan, Utah.

Figure 5B:
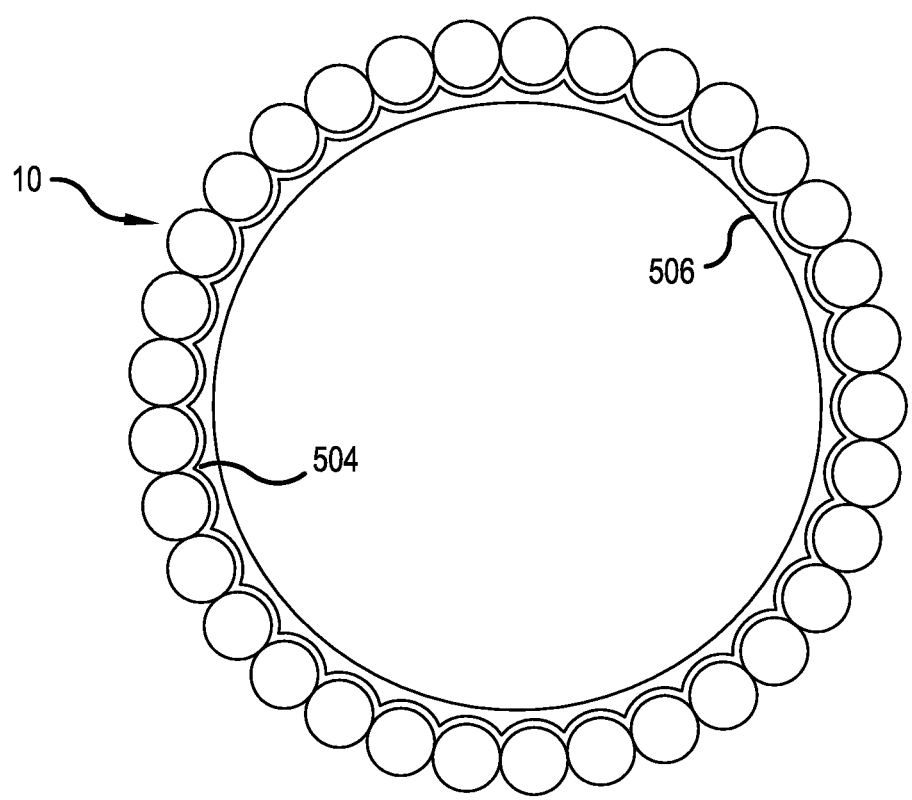
FIG. 5b illustrates a comparison between a flame wall of a fuel grain produced using an example implementation and a flame wall of a traditional fuel grain.

FIG. 5b illustrates a comparison between a flame wall 504 of a fuel grain produced using an example implementation and a flame wall of a traditional fuel grain 506. The example flame wall 504 is forced into the gaps 502 between each of the beads which pulls the boundary layer closer to the grain 10, thus decreasing the distance traveled during heat transfer. As disclosed above and illustrated in FIG. 4, the bead pattern 12 of a printed fuel grain is continuous throughout the grain. Since the bead pattern 12 is continuous, during use of the fuel grain, when one layer in the port is consumed, a new layer is left in its place to continue the reaction thus keeping the boundary layer close to the port walls.

In one implementation, a horizontal fuel grain production system 100 improves production of fuel grain by modifying the physical structure of the additive manufacturing machine build platform used in production.

Figure 6:
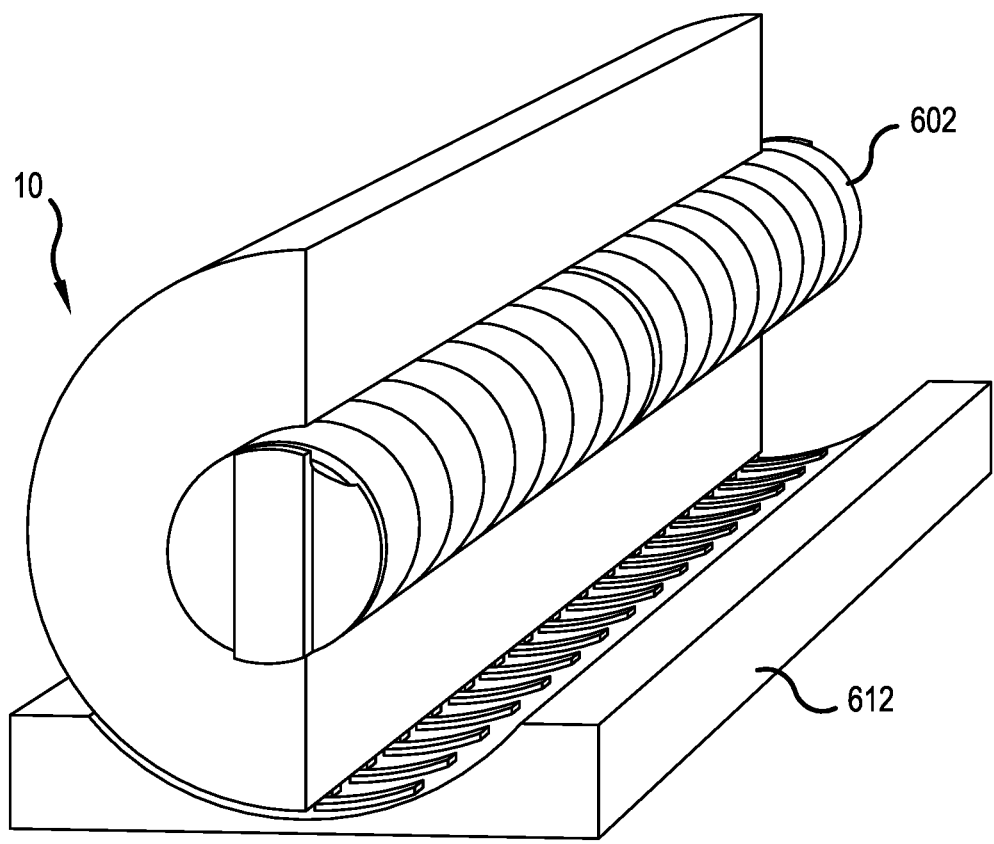
FIG. 6 illustrates a section view of a horizontally-produced fuel grain that has rounded physical structures to support the rounded structure of the fuel grain.

FIG. 6 illustrates a section view of a horizontally-produced fuel grain that has a rounded physical structure 612 to support the rounded structure of the fuel grain 10. As illustrated, after a print of the fuel grain is complete, actuators may lift the grain off of the support platform 612. The support platform 612 is shaped to fit with a bottom of the fuel grain 10. To support a central port structure, e.g., the central port 320 illustrated in FIG. 3, a solid support core 602 may be placed in the fuel grain 10 in place of a printed core. The use of a solid support core is described in detail below with respect to FIG. 10.

Figure 7:
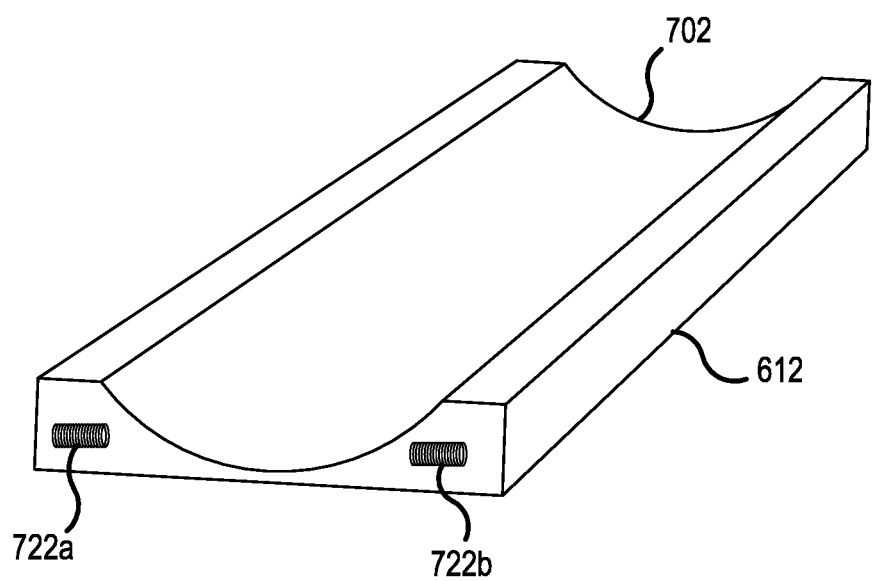
FIG. 7 illustrates a build platform that has a smooth concave profile in a shape corresponding with a bottom section of a fuel grain to be printed on the platform.

FIG. 7 illustrates a build platform 612 that has a smooth concave profile 702 in a shape corresponding with a bottom section of a fuel grain 10 to be printed on the platform 612. Internal heating elements, e.g., heating elements 722a and 722b, can heat the surface of the build platform 612. The heating element improves the adhesion and prevents warping of the imprinted grain.

Figure 8A:
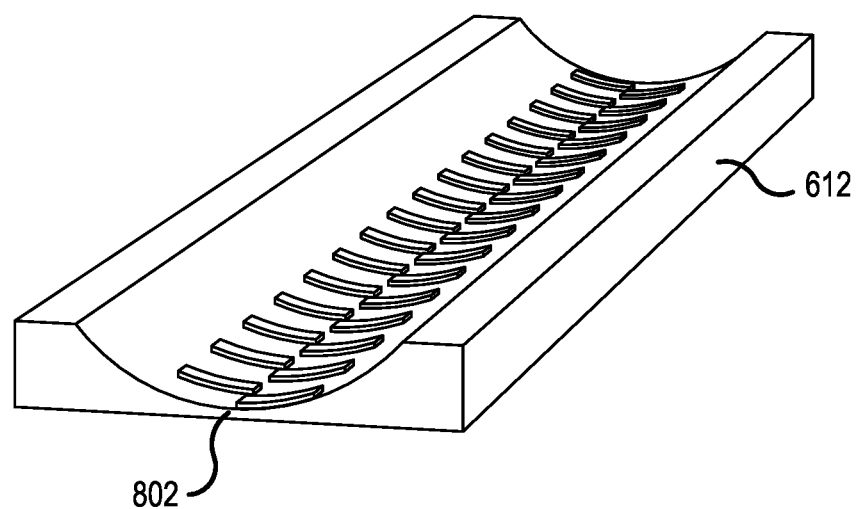
FIG. 8A illustrates the build platform of FIG. 7 with mechanized sections.

FIG. 8A illustrates the build platform of FIG. 7 with mechanized sections 802. Mechanized sections 802 are placed inside the build platform 612 along the central axis of the build platform 612. These mechanized sections 802 can be moved up and down, raising and lowering the sections to push the fuel grain away from the base plate when the fuel grain is complete. The mechanized sections 802 may be configured in any suitable shape and can use any number of ways to move, e.g., electric, hydraulic, or pneumatic actuation as described with respect to FIG. 8B.

During printing of a fuel grain, e.g., fuel grain 10, the mechanized sections remain embedded in the platform 612, creating the smooth concave profile 702 with mechanized sections flush against the surface. As needed, for example, upon completion of the fuel grain, these mechanized sections can be extended above the otherwise smooth contour of the build platform to secure release of the fuel grain from the platform as illustrated in FIG. 8A.

After production of fuel grain 10 has been completed, the horizontal fuel grain production system 100 needs to remove the fuel grain 10 from the build platform 612. This removal is more difficult than removing a vertically-produced fuel grain since more surface area of the fuel grain is on the build platform 612 when the fuel grain is produced horizontally. Furthermore, the fuel grain is very heavy which increases the difficulty of using a tool to separate the fuel grain from the build platform. The fuel grain can be damaged by trying to force it off the platform. In some implementations, to separate the fuel grain from the build surface 612, mechanized sections 802 running along the central axis of the build surface 612 rise up to create space between the fuel grain and the build surface thereby separating the two.

Figure 8B:
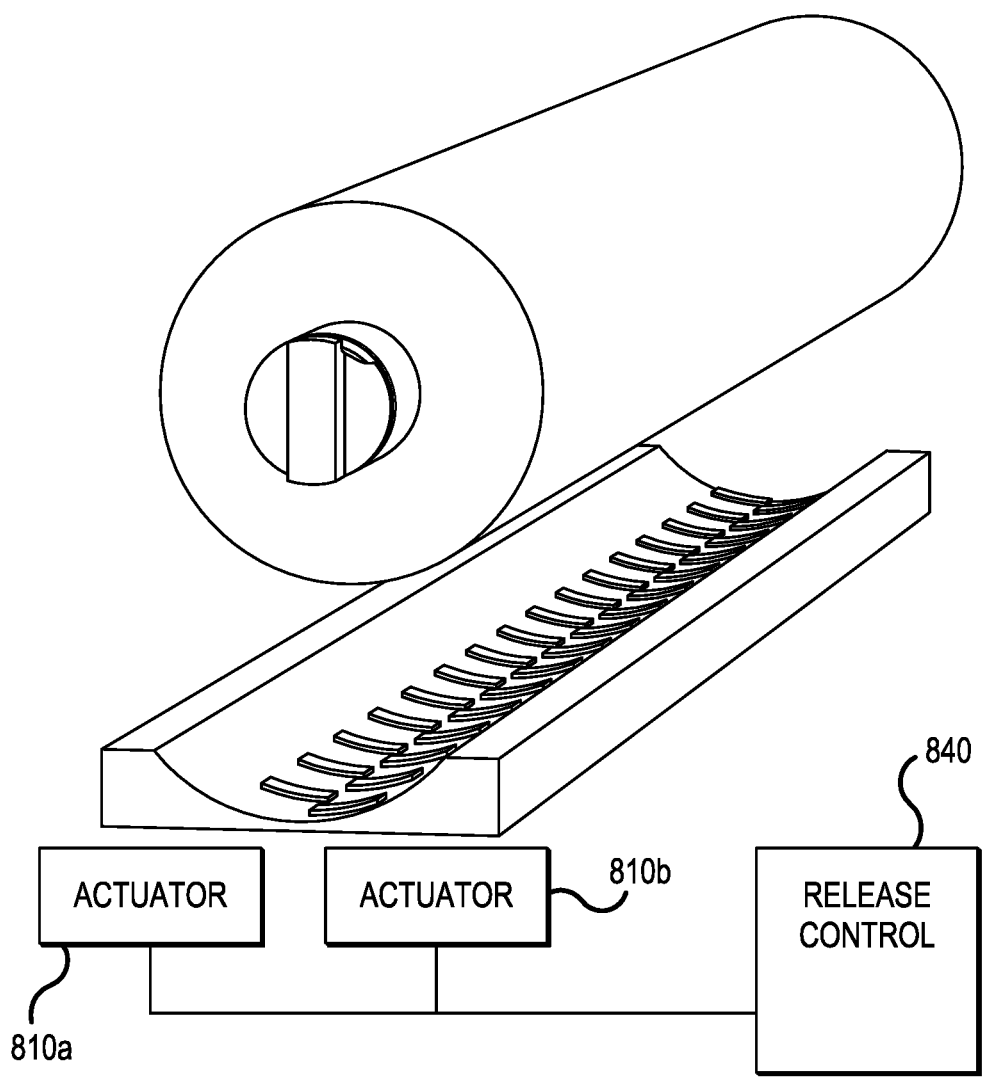
FIG. 8B illustrates the build platform of FIG. 7 with the mechanized sections of FIG. 8A raised.

FIG. 8B illustrates the build platform of FIG. 7 with the mechanized sections of FIG. 8A raised. As shown, the mechanized sections 802 raise away from the build platform 612 in order to separate the fuel grain from the platform. The mechanized sections 802 only need to raise enough to create two separate surfaces to break the bond between the fuel grain and the build plate. For example, the mechanized sections 802 may only raise a small fraction of an inch. Additionally, if the grain is firmly adhered to the mechanized sections, they may be retracted below the surface of the build platform to disconnect the mechanized sections from the grain and then be raised to break the grain away from the build platform. These two movements may be implemented in any order.

The mechanized sections 802 are controlled by a release control 840 that is attached to one or more actuators, 810a, 810b. These actuators can be coupled with the mechanized sections 802 and can be e.g., hydraulic, pneumatic, or electric actuators. When the release control 840 determines that the fuel grain should be released, the mechanized sections, e.g., pins, are actuated upwards to break the bond between the fuel grain and the build platform.

Figure 9:
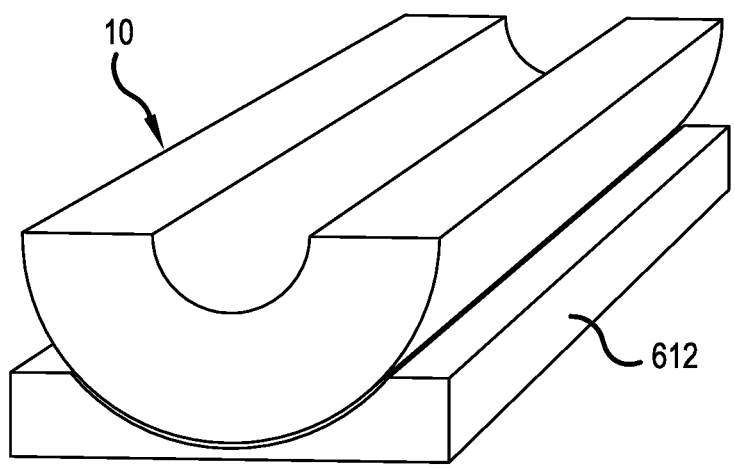
FIG. 9 illustrates half completion of production of a fuel grain.

FIG. 9 illustrates half completion of the production of a fuel grain, e.g., fuel grain 10. At half completion, in some implementations, the additive manufacturing machine pauses printing and removes the print head 214. The horizontal fuel grain production system 100 may place a second support structure solid support core (e.g. solid support core 1002 of FIG. 10) inside the central port of the fuel grain 10.

In other implementations, the additive manufacturing machine may print a support core, layer by layer, continuously along with the fuel grain. The support core may be made of any suitable material, e.g., a water-soluble material.

Figure 10:
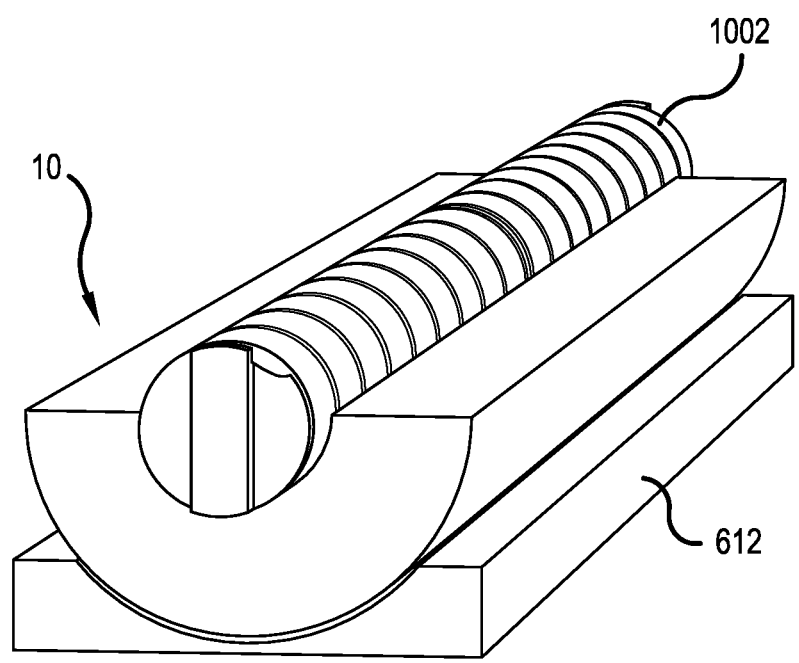
FIG. 10 illustrates a solid support core placed in the central port of a half-completed fuel grain.

FIG. 10 illustrates a solid support core 1002 support structure inside the central port of a partially completed fuel grain, e.g., half-completed fuel grain 10. The solid support core can be made out of any material that would support adhesion to the fuel grain, likely the same material as the build plate, e.g., aluminum. The solid support core 1002 can have a rifling or any other pattern that allows for easy removal, e.g., by twisting. Such a pattern would be understood by one of ordinary skill in the art of casting solid fuel grains. In some implementations, a robotic removal tool or a worker can do the twisting. This twisting is conducted during the post processing process of the fuel grain.

Figure 11:
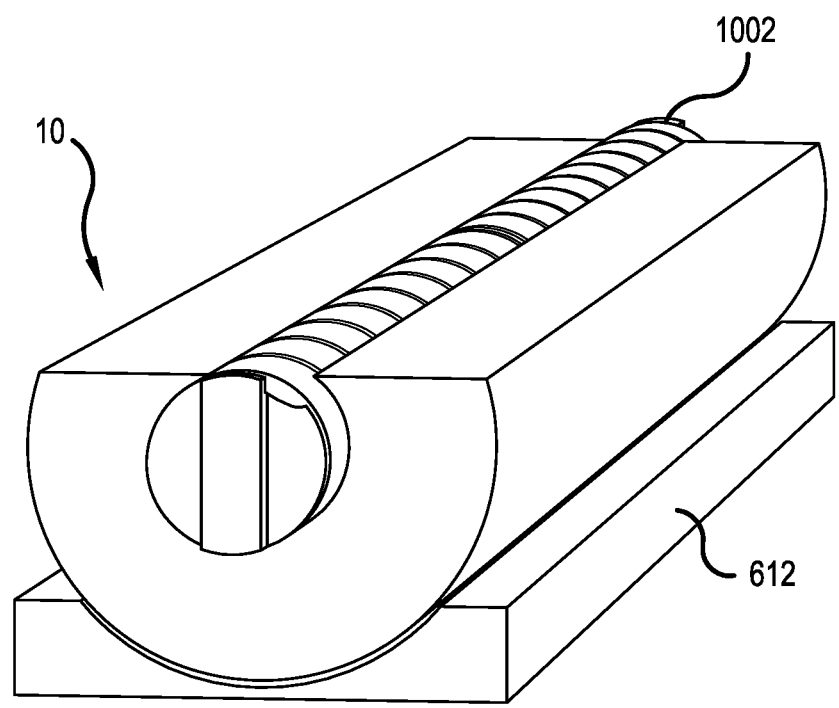
FIG. 11 illustrates printing of the fuel grain around the solid support core of FIG. 10.

FIG. 11 illustrates the continued printing of the fuel grain around the solid support core of FIG. 10. Once the solid support core 1002 is in place, the print head 114 resumes production of the fuel grain, e.g., fuel grain 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for producing a fuel grain for a rocket engine having an intended direction of thrust with an additive manufacturing machine comprising:

receiving a fuel grain model having a central core axis aligned with the intended direction of thrust; and in accordance with the fuel grain model, printing the fuel grain in successive layers, each layer being formed by applying successive fuel beads in a direction primarily parallel to the central core axis.

2. The method of claim 1, wherein printing includes applying successive fuel beads, as the successive layers in two dimensions, defined by the fuel grain model in a direction primarily parallel to the central core axis.

3. The method of claim 1, wherein the fuel grain model defines a footprint area of each of said layers, and printing includes printing a first layer filling a determined footprint area associated with the first layer with fuel material; and printing at least one subsequent layer on top of the first layer after moving a print head to a height of the first layer in order to produce a fuel grain in a horizontal position with respect to the central core axis of the fuel grain model.

4. The method of claim 2, wherein the printing prints successive layers by applying successive fuel beads continuously in each layer to complete the fuel grain.

5. The method of claim 4, wherein the fuel grain is formed by printing successive layers of a dissolvable core.

6. The method of claim 5, wherein the fuel grain and the dissolvable core are printed simultaneously, layer by layer.

7. The method of claim 1, wherein the fuel grain is supported by a support structure formed of the fuel material.

8. The method of claim 1, wherein the fuel grain is supported by a support structure that is made of a different material than the fuel material and can be dissolved in a solution.

9. The method of claim 1, wherein the fuel grain is supported by unique geometrically shaped bead layers that create a support structure.

10. The method of claim 1, wherein the fuel grain is produced on a semi-cylindrical support structure.

11. The method of claim 10, wherein the semi-cylindrical support structure is printed layer by layer along with the fuel grain.

12. The method of claim 10, wherein the method includes pushing the fuel grain away from the build platform including mechanized sections included in a solid build platform included in the semi-cylindrical support structure.

13. The method of claim 4, further comprising:

after printing half of the successive fuel grain layers, supporting the additional fuel grain layers by a form that is placed inside of the fuel grain to support the additional fuel grain layers.

14. The method of claim 3, wherein the first layer is printed in a continuous bead path.

15. The method of claim 1, wherein the fuel grain model is received from a program stored in a memory.

16. A fuel grain for use in an exhausting combustion engine having an intended direction of thrust and produced using an additive manufacturing method comprising:

receiving a fuel grain model having a central core axis parallel to the intended direction of thrust;

in accordance with the fuel grain model, printing the fuel grain by applying fuel beads defined by the fuel grain model, the fuel beads being applied as successive two dimensional layers in a direction primarily parallel to the central core axis.

17. The fuel grain of claim 16, wherein said printing includes applying the successive fuel beads continuously for a predefined distance in the direction primarily parallel to the central core axis.

18. The fuel grain of claim 16, wherein the fuel grain model defines a foot print area of each of said two-dimensional layers, said printing including
   printing a first layer and filling the determined footprint area with fuel material; and
   subsequently printing at least one subsequent layer on top of the first layer after moving a print head to produce a fuel grain overlaying the first layer.

19. The fuel grain of claim 16, wherein the fuel grain includes a dissolvable core.

20. The fuel grain of claim 16 wherein the two dimensional layers are primarily planar.

21. The method of claim 1 wherein the successive layers are primarily planar.

\* \* \* \* \*